Aug. 4, 1953 A. S. VOLPIN 2,647,721
ARRANGEMENT FOR REPACKING VALVE STEMS UNDER PRESSURE
Original Filed Oct. 6, 1947
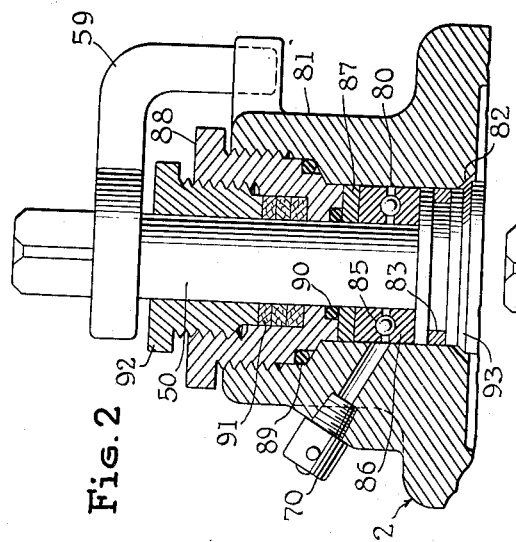
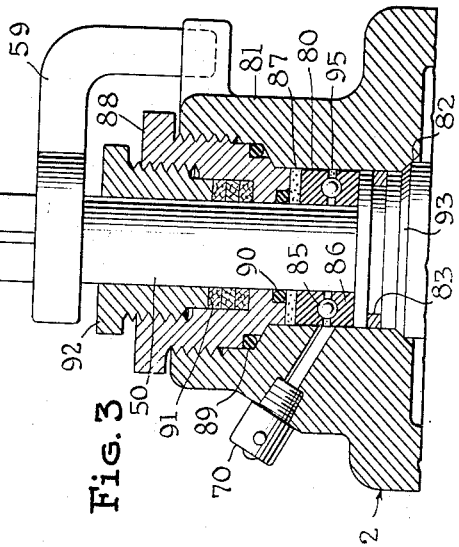
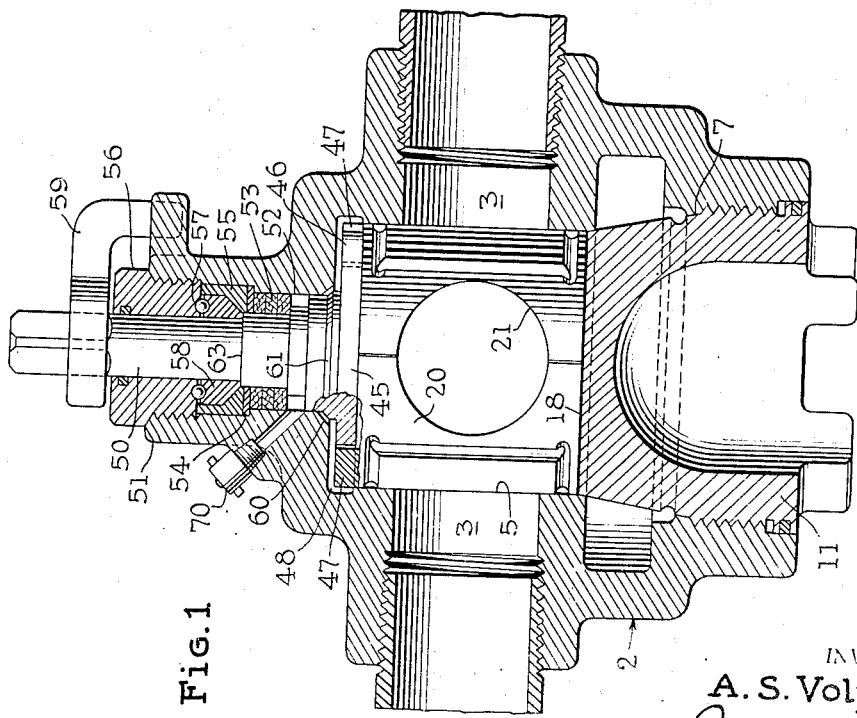
INVENTOR
A. S. Volpin
BY
ATTORNEY

Patented Aug. 4, 1953

2,647,721

UNITED STATES PATENT OFFICE 2,647,721

ARRANGEMENT FOR REPACKING VALVE STEMS UNDER PRESSURE

Alexander S. Volpin, Houston, Tex.

Original application October 6, 1947, Serial No. 778,147. Divided and this application May 26, 1949, Serial No. 95,565

14 Claims. (Cl. 251—103)

This invention relates to valves and more particularly to valves with provision for replacement of the stem packing while the valve is under pressure. While the attached drawings show the invention embodied in a plug type valve provided with automatic lubrication features, it is equally applicable to a wide variety of other types of valves.

This application is a division of my prior copending application, Serial No. 778,147, filed October 6, 1947, for Automatic Lubricated Sleeve Plug Valve.

It is an object of the invention to provide a gland type packing for valve stems in combination with cooperating metal sealing faces on the stem and valve body where the faces may move into sealing position to permit replacement of the gland packing under pressure.

Another object of the invention is to provide a replaceable gland packing assembly for rotatable valve stems wherein a seal is provided upon axial movement of the valve stem during the replacing operation while the valve member holds the line pressure from passing through the valve.

A further object of the invention is to provide a dual packing assembly for rotatable valve stems wherein a metal to metal seal is created due to the pressure on the valve when a fusible member permits axial movement of the valve stem.

A still further object of the invention is to provide a valve having a separable stem for movement of the valve member.

Other and further objects of the invention will be readily apparent when the following description is considered in connection with the accompanying drawings, wherein—

Fig. 1 is a vertical sectional view of a plug valve embodying the invention and illustrating the plug in closed and sealed position.

Fig. 2 is a vertical section of the stem packing assembly including a fusible member to permit the formation of a seal about the stem in event the valve is subjected to extreme heat.

Fig. 3 is a section similar to Fig. 2, illustrating the arrangement after the valve has been subjected to heat.

In Fig. 1 the valve body 2 has a flow passage 3 extending therethrough to receive the ends of the pipe line in which the valve is to be incorporated. This flow passage 3 is intercepted by a vertical chamber 5 which is shown as being of uniform diameter where it intersects the flow passage 3. Below the flow passage the body is tapered at 7 to provide an open base.

The upper or inner end 18 of the closure 11 serves to form the base of the chamber 5 against which the plug member 20 may abut.

The plug member 20 is shown in Fig. 1 as being made up of a hollow cylinder, and having the opening 21 therein to be aligned with the flow passage 3.

In order to actuate or rotate the plug member 20, a cross-head 45 is provided, as best seen in Fig. 1. This cross-head is arranged with recessed ends 46 which fit about the upstanding lugs 47 arranged substantially on a diameter of the plug. This cross-head is, of course, axially movable with respect to the plug due to the provision of the space 48, best seen in Fig. 1, at the top of the chamber 5, so that there will be limited axial movement of the plug and the cross-head 45.

The cross-head 45 has the valve stem 50 formed therewith and this stem extends through the upper reduced end 51 of the body. The opening 52 is arranged to receive the gland packing 53 as seen in Fig. 1 and this packing is retained in position by a junk ring 54, the bushing 55, and the gland 56, which gland is screwed into the upper end of the body 51. This gland also abuts against the anti-friction bearings 57 which are disposed against the bearing ring 58. The bushing 55 retains the packing in position while the bearings 57 reduce the torque required to turn the valve. A stop and indicator arm 59 may be carried by the stem.

One of the particular features of this valve stem packing assembly resides in the arrangement of a beveled seat 60 in the body where the chamber 5 merges with the neck or packing opening 52. The stem 50 is of the non-rising type but has a complementary beveled face 61 which is seen in Fig. 1 as being spaced from the seat 60 and retained in such spaced relation by the gland 56 and the bearings 57 due to the bearing ring 58 abutting against a shoulder 63.

In event that the bearings 57 or the packing 53 require replacement, it seems obvious that by a slight unscrewing of the gland 56, that the pressure within the valve will tend to lift the cross-head 45 and the stem 50 a limited distance. This axial movement of the stem causes the face 61 to move into engagement with the face 60 so as to form a metal to metal seal to prevent any leakage of the pressure from the pipe line or the valve chamber. When this seal is thus formed with the cooperating faces, the gland 56 may then be removed and the bearings or the packing, or both, replaced at will while the valve is under pressure.

In order to provide for sealing material for the gland packing 53 an additional fitting 70 is shown in the upper left hand portion of Fig. 1. This additional fitting permits introduction of sealing material into the packing area 52 and this sealing material will move upward due to line pressure and thus augments the sealing of the gland packing. When it is desired to remove the gland packing, pressure through the fitting 70 may be used to expel the packing.

Figs. 2 and 3 show a modified arrangement of the stem packing wherein the passage 80 in the neck 81 of the valve body has the sealing face 82 at its lower end where it merges with the valve chamber. The stem 50 is substantially the same as described in connection with Fig. 1 except that it may have an annular wiping ring 83 and the anti-friction bearings 85 may be arranged in the bearing race 86 about the stem 50.

This bearing race 86 will be held in position by a fusible ring 87 of any suitable material, which is arranged to melt or become softened so that it may flow under pressure at a predetermined temperature. This fusible ring 87 abuts the gland 88 which is similar to the gland 56. This gland in turn carries pressure type seal rings 89 and 90 to seal the gland with the body and the stem respectively. A conventional packing 91 is retained by the adjustable nut 92 threaded into the gland 88.

The stem 50 has the cooperating face 93 thereon. The cooperating faces 82 and 93 are seen as the faces 60 and 61 of Fig. 1.

If for some reason it is desired to replace the bearings 86, the fusible ring 87, the packing rings 89 and 90, or the packing 91, it is only necessary to unscrew the gland 88 sufficiently to allow the valve stem to move upwardly until the faces 82 and 93 engage each other. A metal to metal seal is then formed and any desired replacement may be made.

Fig. 3 shows a fusible ring 87 as having been melted sufficiently to allow axial movement of the stem and the forming of the seal with the faces 82 and 93.

The fusible metal is shown at 95 as having moved down in around the bearing in permitting the axial movement.

The invention contemplates a high pressure valve which enhances the safety of the valve because the stem packing and the stem thrust parts may be replaced while the valve is under pressure to avoid shut down of the line in which the valve is embodied. In event of fire, a safe stem seal is automatically formed by melting of the fusible ring, as seen in Figs. 2 and 3. This permits the automatic formation of a metal to metal seal.

Broadly the invention contemplates a valve having a replaceable valve stem sealing assembly so that the stem may be repacked under pressure while the valve stem is sealed to the body; and a fusible member arranged in the valve stem packing assembly so as to permit the creation of a metal to metal seal when the valve is subjected to excessive heat.

What is claimed is:

1. A plug valve including, a body, a flow passage therethrough, a ported plug in said body to open and close said passage, means to feed sealing material to the downstream face of said plug, an operable stem separably engaging said plug, an anti-friction bearing positioned between said stem and said body so as to support the axial thrust on said stem, a packing about said stem, and cooperating sealing faces on said stem and body which are normally spaced apart by said bearing, and means to release said bearing to permit axial movement of said stem to create such seal while the plug is maintained in sealed engagement with said body, said means comprising a spacing member disposed between said packing and said bearing, said member being composed of material which is fusible at temperatures sufficient to impair said packing.

2. A valve including a body having a flow passage therethrough, a rotatable ported valve therein, a stem to rotate said valve, a slidable connection for said stem to said valve, a packing about said stem intermediate said stem and said body, means to resist the thrust on said stem including an anti-friction bearing disposed in said body surrounding said stem, cooperating metal faces on said stem and body retained in spaced relation by said means but released to move into engagement to seal said body about said stem due to the internal valve pressure upon release of said means so as to replace said packing, and a ring member surrounding said stem and interposed between said packing and said bearing, said ring member being composed of material which is fusible at temperatures sufficient to impair said packing.

3. A valve including a body having a flow passage therethrough and a valve member operable to open and close said passage, a valve stem extending into said body and engaging said valve member, cooperating sealing faces on said stem and body normally held in spaced relation, a packing for said stem, a member of low fusing point held in thrust by said stem whereby an elevation of temperature about said valve sufficient to impair the sealing of said packing will cause fusion of said member and allow pressure on said valve to move said stem outward to establish a seal between said faces thereby automatically shutting off line pressure against said packing.

4. A valve including a body having a flow passage therethrough, a valve member therein, a stem separably engaged to move said valve member and extending through a bore in said body, cooperating sealing faces on said stem and body, hold down means to normally hold said faces in spaced relation, an annular chamber between said stem and bore to receive a packing and a stem thrust member, said hold down means adapted to close said bore and being releasably carried by said body to maintain said faces in spaced relation, said hold down means being releasable to allow the stem to move axially of said body and independently of said valve member to effect a seal about said faces so that the thrust member and packing may subsequently be entirely removed while said valve is subject to line pressure, and a spacer member interposed between said packing and said hold down means, said spacing member being composed of material fusible at temperatures sufficient to impair said packing.

5. A plug valve including, a body, a flow passage therethrough, a plug in said body to close said passage, means to feed sealing material to the downstream face of said plug, an operable stem separably engaging said plug, an anti-friction bearing to support the axial thrust on said stem, a packing about said stem, cooperating sealing faces on said stem and body, means to normally hold said faces spaced apart, said means being movable to release said bearing to permit axial movement of said stem to create such seal while the plug is maintained in sealed engagement with said body.

6. A valve including a body, a rotatable valve therein, a stem to rotate said valve, a slidable connection for said stem to said valve, a packing about said stem, means to resist the thrust on said stem including an anti-friction bearing, cooperating metal faces on said stem and body retained in spaced relation by said means but adapted to move into engagement to seal said body about said stem upon release of said means so as to replace said packing.

7. A valve including a body, a rotatable valve therein, a stem to rotate said valve, means to resist the thrust on said stem including an anti-friction bearing, cooperating metal faces on said stem and body retained in spaced relation by said means but adapted to move into engagement to seal said body about said stem upon release of said means so as to seal said valve for replacement of said packing, said means also including a fusible ring to permit sliding of said stem and sealing of said faces in event of fusion thereof.

8. A plug valve, including a body, a valve plug therein, a stem to engage and turn said plug, interengaging slidable means on said stem and plug, a packing to seal between said stem and body, and means to form a seal between said stem and body to permit replacement of said packing while the valve is closed and under line pressure, including a pair of cooperating faces to move into sealing engagement upon longitudinal movement of said stem relative to said packing.

9. A valve having a body, a valve stem extending into said body, cooperating sealing faces on said stem and body normally held in spaced relation, a packing for said stem, a member of low fusing point held in thrust by said stem whereby an elevation of temperature about said valve sufficient to impair the sealing of said packing will cause fusion of said member and allow pressure on said valve to move said stem outward to establish a seal between said faces thereby automatically shutting off line pressure against said packing.

10. A valve including a body, a valve member therein, a stem separably engaged to move said valve member and extending through a bore in said body, cooperating sealing faces on said stem and body and normally held in spaced relation, an annular chamber about said stem, a packing therein to seal about said stem and body, a stem thrust member, releasable hold-down means carried by said body and receiving the combined thrust of said packing and stem, the arrangement being such that a partial release of the hold-down means allows the said cooperating sealing faces to establish a seal upon an outward movement of said stem, said hold-down means being completely removable from said body to permit replacing of said packing while the valve is under pressure.

11. A valve including a body, a valve member therein, a stem separably engaged to move said valve member and extending through a bore in said body, cooperating sealing faces on said stem and body normally held in spaced relation, an annulus between said stem and bore to receive a packing and a stem thrust member, a releasable thrust hold-down member adapted to close said bore and carried by said body to maintain said faces in spaced relation, said hold-down being releasable to allow the stem to move axially of said body and independently of said valve to effect a seal about said faces so that the thrust member and packing may subsequently be entirely removed under pressure from said valve for replacement.

12. A plug valve including, a body, a flow passage therethrough, a plug in said body to close said passage, an operable stem separably engaging said plug, an anti-friction bearing to support the axial thrust on said stem, a packing about said stem, cooperating sealing faces on said stem and body which are normally spaced apart, and means to release said bearing to permit axial movement of said stem to create such seal while the plug is maintained in sealed engagement with said body.

13. A plug valve including, a body, a flow passage therethrough, a plug in said body to close said passage, an operable stem slidably engaging said plug, an anti-friction bearing to support the axial thrust on said stem, a packing about said stem, cooperating sealing faces on said stem and body which are normally spaced apart, and means to release said bearing to permit axial movement of said stem to create such seal while the plug is maintained under pressure in sealed engagement with said body so that said packing may be replaced.

14. A lubricated plug valve including a body, a flow passage therethrough, a plug in said body to close said passage, means to feed sealing material to the downstream face of said plug, an operable stem slidably engaging said plug, an anti-friction bearing to support the axial thrust on said stem, a packing about said stem, cooperating sealing faces on said stem and body which are spaced apart, and means including said bearing to hold said faces in such spaced apart position, said means being releasable to release said bearing to permit axial movement of said stem to create such seal while the plug is maintained under pressure in sealed engagement with said body so that said packing may be replaced.

ALEXANDER S. VOLPIN.

References Cited in the file of this patent

UNITED STATES PATENTS

| Number | Name | Date |
|---|---|---|
| Re. 20,643 | Goldsmith | Feb. 1, 1938 |
| 21,237 | Winslow | Aug. 17, 1858 |
| 1,913,894 | Nordstrom | June 13, 1933 |
| 1,966,807 | Sweet | July 17, 1934 |
| 2,421,879 | Hamer | June 10, 1947 |